July 10, 1951 C. B. DAVIS 2,560,091
FIRE CONTROL SYSTEM
Filed Nov. 29, 1947 3 Sheets—Sheet 3
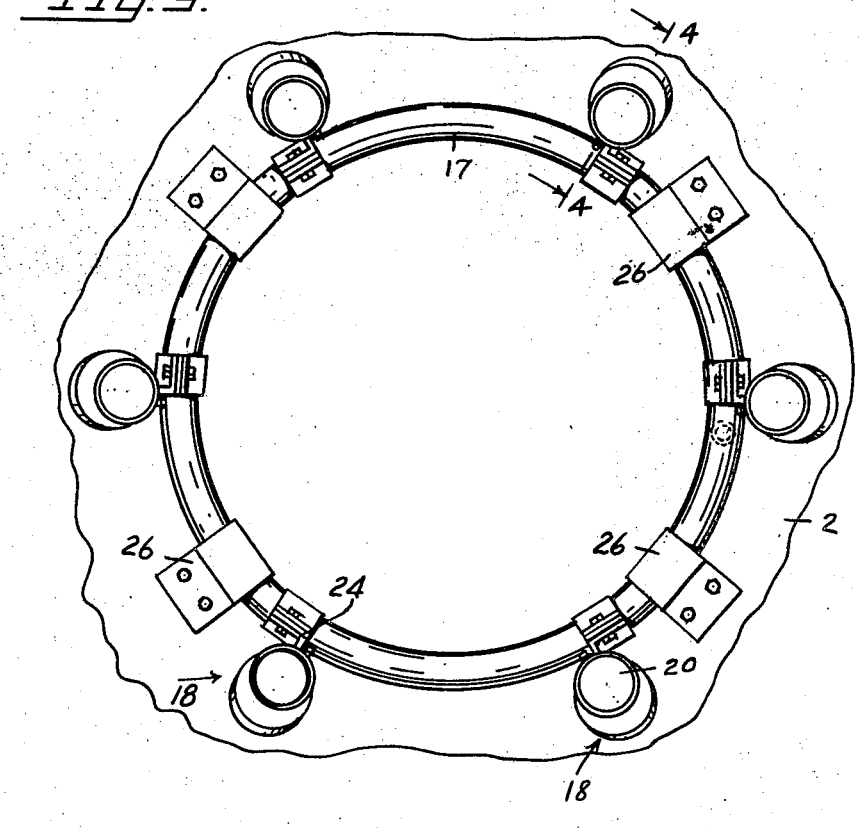
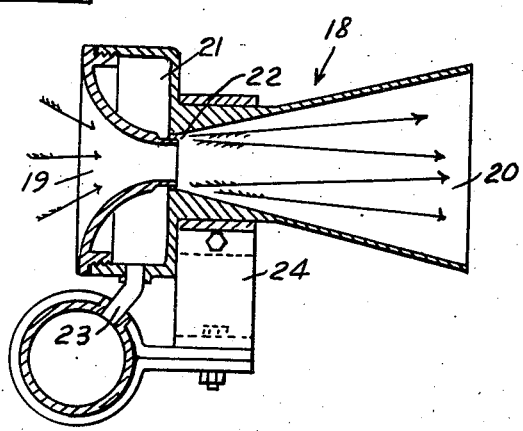
INVENTOR.
CHARLES B. DAVIS
BY
Boyken Mohler & Beckley
ATTORNEYS.

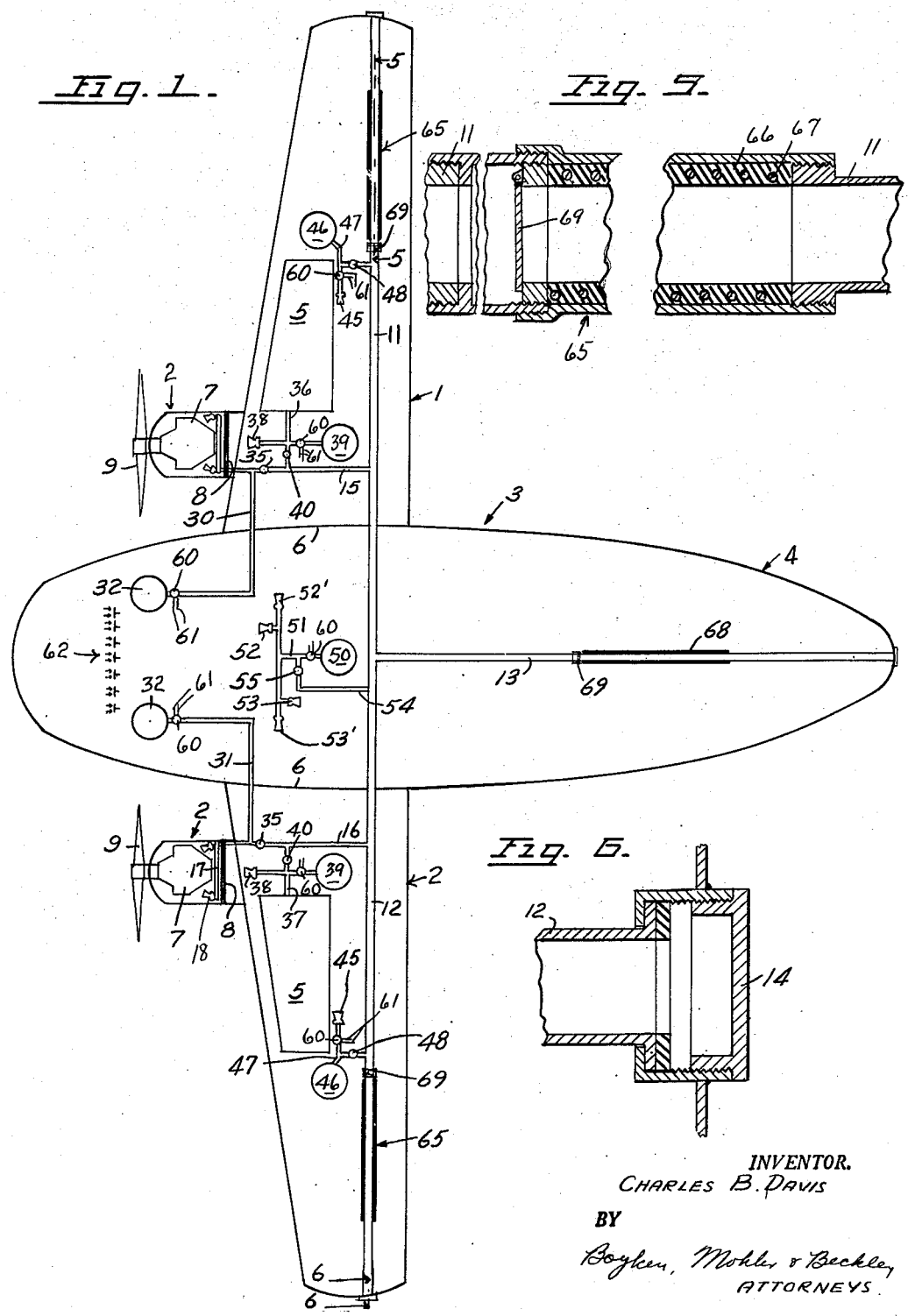

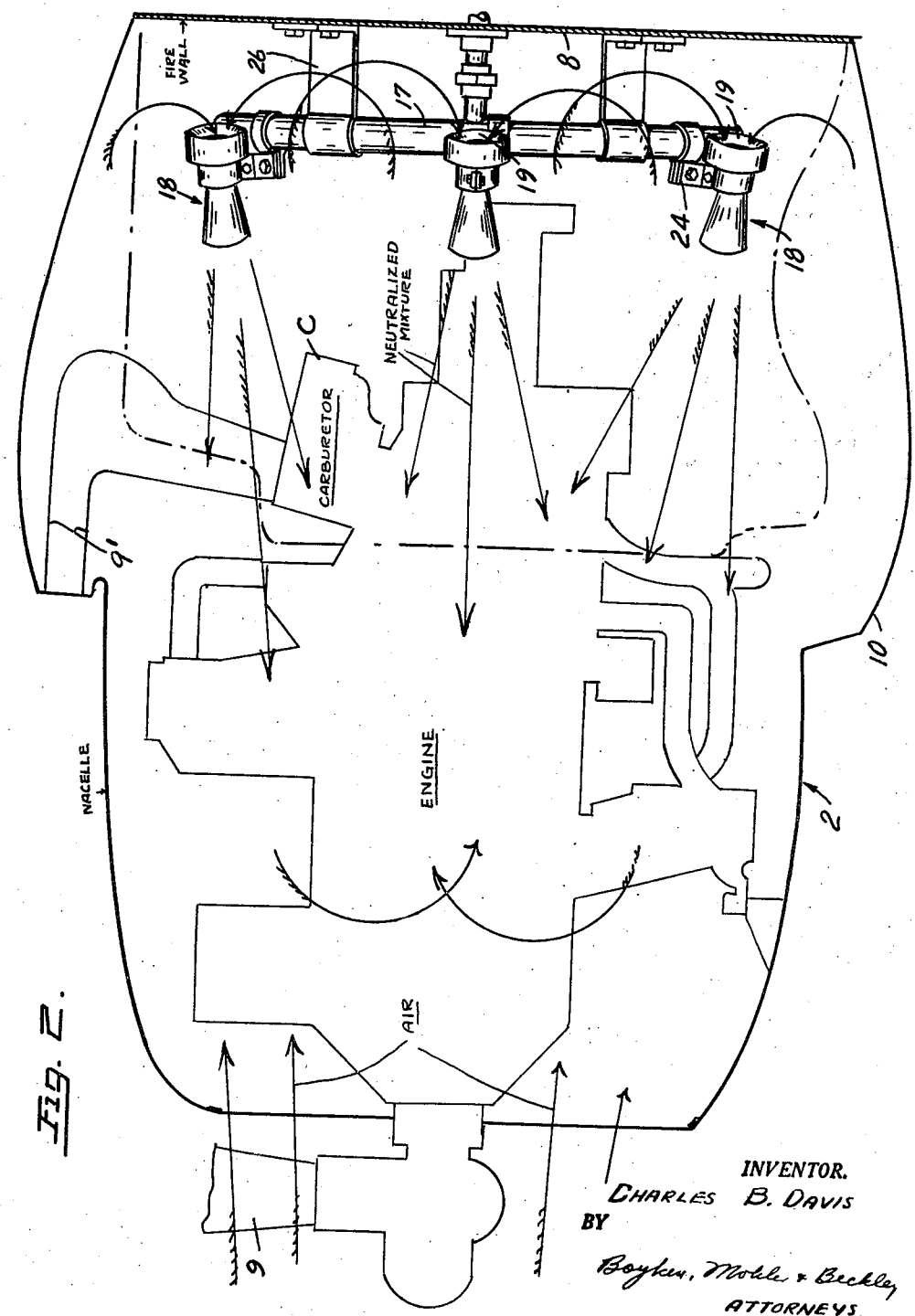

Patented July 10, 1951

2,560,091

UNITED STATES PATENT OFFICE 2,560,091

FIRE CONTROL SYSTEM

Charles B. Davis, Carson City, Nev.

Application November 29, 1947, Serial No. 788,773

12 Claims. (Cl. 169—2)

1

This invention relates to a fire control system for aircraft and to a method of controlling or fighting fire that may break out in aircraft.

One of the objects of the invention is the provision of a fire control system in aircraft for more rapidly bringing fire in aircraft under control and extinguishing it than heretofore.

Another object of the invention is the provision of an improved system of fire control in aircraft for extinguishing engine fires more rapidly and with greater certainty than heretofore.

A still further object of the invention is the provision of an improved system for extinguishing fire in a nacelle and for protecting the fire wall and oil and fuel lines leading through such wall to the engine when a fire occurs in a nacelle.

An added object of the invention is the provision of a system for fighting fire in an aircraft when the craft is in flight and which system is adapted to be employed for forcing any desired liquid or gas therethrough from an outside source when the aircraft is on the ground.

Another object of the invention is the provision of structure in a fire fighting system in an airplane whereby fire extinguishing fluid may be forced through the system when the airplane is on the ground from points at the wing tips or tail even though the extremities of the airplane may be broken at the points where shearing usually occurs upon damage due to a forced landing, and which system includes means for forcing a fluid therethrough when the airplane is on the ground or in flight.

Heretofore the means most generally employed in airplanes or aircraft for fighting fires are conventional fire extinguishers. In the case of engine fires when the aircraft is in flight, extinguishers are of no use because the engines in their nacelles (in multi-engine aircraft) are not accessible to the members of the crew. Also, unless a person happens to be where the fire starts and at about the time it starts, the conventional extinguishers are of little use.

Systems have been devised for the use of some gas, such as $CO_2$. These systems, as a rule, simply comprise pipes laid to various parts of the airplane and connected with bottled gas. The pipes are perforated in the areas where it is thought the fire hazard is greatest. Remote control valves in the pipes are commonly used.

The principal objection to the above system is that when the gas is released in an engine nacelle, the headwind pressure is so great that the gas is merely carried out of the nacelle with the air and none of it may even come near the

2 fire. Consequently the fire rages on until it breaks through the fire wall or creates heat at the fire wall of such intensity as to ignite gas or fuel within the wing, and then it is out of control unless the release of the $CO_2$ gas within the wing has had an opportunity to spread sufficiently to prevent combustion. Since the $CO_2$ gas is merely ejected into the wing, it spreads slowly and must either displace the air therein or mix with it sufficiently to neutralize its capacity to support combustion. Usually the slowness with which the $CO_2$ gas is distributed renders the gas relatively ineffective for bringing the fire under control and extinguishing it unless the ejection of the gas is directly onto the base of the flame when the fire breaks out.

With the present invention the fire extinguishing fluid, of what ever kind is employed, is quickly mixed with the air to neutralize its capacity to support combustion and the air and gas mixed therewith is rapidly circulated throughout the fire zone. In the engine nacelle, my system functions to directly and forcibly eject the $CO_2$ gas or other fire extinguishing fluid toward the engine and in a direction opposite to the direction in which the air tends to flow and in a manner to build up a zone of gas in the nacelle starting from the fire wall, wherein combustion cannot be maintained. Also my system draws hot air away from the fire wall rather than into it, thus protecting the wall.

Other objects and advantages will appear in the drawings and in the specifications.

In the drawings,

Fig. 1 is a diagrammatic view illustrating one form that the present invention may take in an airplane.

Fig. 2 is a semi-diagrammatic view of a nacelle, the engine being in outline and my system being indicated in position therein.

Fig. 3 is a front elevational view of the extinguisher nozzles indicated in Fig. 2 looking toward the fire wall.

Fig. 4 is an enlarged sectional view taken along line 4—4 of Fig. 3.

Fig. 5 is an enlarged sectional view taken along line 5—5 of Fig. 1.

Fig. 6 is an enlarged sectional view taken along line 6—6 of Fig. 1.

In detail, Fig. 1 diagrammatically shows the outline of an airplane having aligned wings 1, nacelles 2 along the forward edges of said wings and a fuselage 3 that includes a tail section 4.

It is common in multi-engined airplanes for the fuel tanks 5 to be carried within the wings, and these wings are partitioned from the fuselage by walls 6, while the nacelles in which engines 7 are positioned are separated from the wings by fire walls 8. The forward ends of the nacelles are usually open for admission of air under the influence of the propellers 9 and headwind pressure into said nacelles (Fig. 2).

The engine 7 in each nacelle usually has the carburetor C (Fig. 2) positioned at the rear side and an air duct 9' extends from an opening into the nacelle to said carburetor for supplying air to the latter. Oil for lubrication is held in a chamber in the lower part 10 of the nacelle and is air cooled.

Extending longitudinally through wings 1 from their tips are pipes 11, 12 that may be connected within the fuselage with each other and with a pipe 13 that extends longitudinally of the fuselage to the terminating end of the tail section. This pipe 13 and pipes 11, 12 are each closed at their outer terminating ends by caps 14 (Fig. 5) that may be quickly removed and the conventional coupling of a fluid pressure hose (not shown) connected therewith for pumping a fire extinguishing fluid of either gas, liquid, or foam-forming type through said pipes.

Pipes 11, 12, respectively connect with branch pipes 15, 16 that respectively extend through the fire walls 8 in nacelles 2.

Within each nacelle is a generally annular pipe 17 with which the pipes 15, 16 respectively are connected (Figs. 2, 3). Inasmuch as the structure within the nacelles is identical, the pipe 17 that is connected with pipe 15 will be described in detail, including the injectors connected with pipe 17.

Connected with pipe 17 at spaced points therearound are air injector nozzles 18 of the type having a through bore of generally venturi shape with an inlet 19 at one end and an outlet 20 at the other end (Fig. 4). An annular chamber 21 is around the said bore and an annular aperture 22 around said throat opens into the bore in a direction directed toward the outlet 20. This annular chamber 21 of each injector communicates with the pipe 17 by conduits 23, and brackets 24 may also secure the injectors to the said pipe 17.

The pipe 17 is preferably in a substantially vertical plane parallel with the vertical fire wall 8 and the injectors have their outlets 20 directed forwardly and generally toward the engine 7 (outlined in Fig. 4) that is between the fire wall and the forward open end of the nacelle. The inlets 19 are adjacent the fire wall 8 but are spaced therefrom. Any suitable means, such as brackets 26 may secure the pipe 17 to the fire wall or to any other part of the nacelle.

At least one of the injectors is directed toward the carburetor C inasmuch as this is one of the places where a fire in the nacelle is most likely to commence.

Connected with the branches 15, 16 are pipes 30, 31 (Fig. 1) that may extend into any desired part of the airplane separate from the nacelle, such as the cockpit, for example, where said pipes may connect with bottles 32 of a source of gaseous fire extinguishing fluid. Liquid $CO_2$ under pressure is one form of fluid that is suitable. Upon its release it forms $CO_2$ gas that is ejected through the injectors in the nacelles toward the engine and contra to the flow of air into the nacelle. Thus the content of $CO_2$ gas in the air in the cockpit is quickly increased to the point where the air around the engine cannot support combustion. The headwind pressure prevents the escape of the $CO_2$ from the nacelles until the gas in each nacelle reaches the forward opening.

Any flame in the nacelle tends to be driven backward against the fire wall and the heated gas and flame that may reach said wall is sucked into the inlets 19 of the injectors and is extinguished. The fire wall is thus kept relatively cool and the danger of the fire dangerously heating said wall and the fuel lines extending therethrough to the fuel tanks is greatly reduced. This arrangement of the injectors thus results not only in ejecting $CO_2$ gas into the nacelle and against the normal direction of flow of the air that tends to drive the flame against the fire wall, but it also draws the heated gas and flames away from said wall.

Under normal circumstances, where the fire in one or more nacelles is not promptly extinguished while the airplane is in flight, the $CO_2$ gas and the arrangement of the injectors is such that the airplane is able to safely reach an emergency landing where conventional land fire fighting equipment may be connected with the pipes 11, 12, 13 to force any desired fluid through the said pipes to the injectors.

Check valves 35 in pipes 15, 16 prevent the $CO_2$ gas from the bottles 32 from passing into the main lengths of said pipes to the main pipes 11, 12, 13.

Pipes 36 and 37 may connect the branches 15, 16 with the fuel tanks. One or more injectors 38, such as shown in Fig. 4, is connected with each pipe 36, 37 and a bottle 39 of $CO_2$ or other suitable fire extinguishing fluid under pressure may be connected with each injector 38. Check valves 40 in the lines between the bottles 39 and the injectors 38 prevent the gas from flowing back into pipes 15, 16.

Other injectors, such as ejectors 45, may be at the ends of the wings outwardly of the fuel tanks and these may be respectively connected with bottles 46 of fire extinguishing fluid through pipes 47 that in turn may connect with pipes 11, 12 respectively. Check valves 48 in the connections between pipes 47 and pipes 11, 12 prevent the gas from the bottles 46 from passing into pipes 11, 12.

A bottle 50 within the fuselage may connect by a pipe 51 with forwardly and rearwardly directed injectors 52, 53 and a pipe 54 may connect pipe 51 with the pipe 12. Check valve 55 in pipe 54 prevents the gas in the bottle from entering the pipe 12.

By the foregoing arrangement, each injector or group thereof (where more than one is used as in each nacelle) is adapted to be supplied with $CO_2$ for ejection of $CO_2$ gas therefrom, but the gas will not flow into the pipes 11, 12, 13. However, fluid may be supplied to the injectors through said pipes 11, 12, 13.

The pipe connections between each bottle and each injector or group thereof has a conventional motor actuated valve 60 therein, such as a solenoid actuated valve. These are in an electrical circuit 61 that extends to the cockpit where switches 62 accessible to the pilot may open the gas line between any of the bottles and the ejector or ejectors connected therewith, as desired. The complete electrical wiring is not shown inasmuch as this is common structure and would merely complicate the drawings.

The valves 60 do not interfere with communication between the outer ends of pipes 11, 12, 13 and the injectors.

Preferably a section 65 in each pipe 11 is lined with a collapsible flexible material 66 similar to self sealing material used in gasoline tanks and in tires (Fig. 5), and in which a coiled wire 67 of soft flexible metal is embedded. These sections 65 are at the shear points in the wings and will usually seal off the pipes 11, 12 in the event of twisting and bending caused by injury to the wings. Clapper valves 69, which function as check valves, are preferably positioned adjacent each section 65 between such section and the fuselage to prevent outflow of fluid. A similar valve and section 68 is in the pipe 13 in the tail section at the shear point.

It is to be noted that the ejectors 38, 45 in each wing are so arranged as to set up a circulation of air around the fuel tank with an ever increasing content of $CO_2$ while ejector 38 is also directed toward the fire wall of the nacelle. This arrangement tends to isolate the fuel tanks and to also build up a uniform gas mixture in the wings that will not support combustion. Any fire that may tend to break out in the wing at the fire wall due to heat in the nacelle will be extinguished by the ejector 38.

The oppositely directed ejectors 52, 53 in the fuselage (which is preferably partitioned from the cockpit) also rapidly circulates the air in the fuselage and creates a gas mixture that will not support combustion.

The ejectors in passenger airplanes are preferably so arranged that the passenger compartments are closed off from the compartments wherein the ejectors are positioned. They may be in the baggage compartment, wings, nacelles, but usually small portable extinguishers are capable of taking care of any emergency that may arise in the passenger compartment.

In present fire extinguishing systems in airplanes there are numerous detecting devices for detecting smoke, fumes, heat, etc. that may be employed in the system above described without invention. Also impact or inertia actuated valves, thermostatically actuated valves, etc. may be used if and where desired. These are old in airplanes and function automatically.

Referring to Fig. 2, the dot-dash line 70 therein, together with the fire wall 8, generally encloses or defines the most likely area within the nacelle, where fire will occur and out of which area the fire should be kept. If the fire occurs ahead of this line and can be kept out of the area for a reasonable time, it will usually soon exhaust itself. Hence, by positioning the air injectors 18 where they will reduce or eliminate the fire hazard rearwardly of line 70 and just ahead of the fire wall, the chance of a serious or fatal accident due to fire breaking out in the nacelle is reduced to the minimum.

The opposite sides of the annular aperture in the injectors are spaced apart a relatively small distance, whereby the pressure of the fire extinguishing fluid is relatively great. This spacing may be as small as about .005 of an inch although it is usually greater. Where liquid is forced through the aperture, it will produce a thick uniform fog that is highly effective for controlling fires and dissipating heat.

It is to be understood that the invention is not restricted to any specific kind of fire extinguishing fluid, although the use of a gas or of a liquid that is converted by expansion into gas is preferably used when the airplane is in flight.

Referring to Fig. 1 it is very desirable that fire extinguishing fluid be directed toward the walls 6 in the event of fire in the wings, so that such fire may be prevented from extending into the fuselage. Thus ejectors 52', 53' may be positioned adjacent ejectors 52, 53 that are so directed toward said walls 6.

While the apertures 22 in the ejectors may be of uniform area, it is preferable that the apertures in the ejectors that are directed toward the parts of the aircraft which have a high magnesium content, such as engines, wheels, etc., are of a greater area or spacing so as to produce a hollow stream through the ejector when fire foam or water is forced therethrough under pressure. The stream will break off burning magnesium and allows a safer method of dealing with burning parts having a high magnesium content.

It is to be understood that by the present system, fire prevention as well as the extinguishment of fire, is accomplished, and such fire prevention is one of the objects of the invention. For example, when the danger of a fire breaking out is imminent, the extinguishing fluid circulated in the danger areas will prevent combustion by neutralizing the air therein to the point where it will not support combustion.

It is to be understood that the detailed description and drawings are merely illustrative of a preferred form of the invention. All forms of airplanes and their individual variation cannot be shown, but the present invention is applicable to airplanes having pusher type propellers or where the engine is in the nose of the fuselage or on the longitudinal axis thereof, or positioned within the wings instead of being in nacelles projecting therefrom.

I claim:

1. In an airplane having a compartment for the engine including a fire wall rearwardly of the engine relative to the direction of flight of said airplane and between said engine and the remainder of the airplane, an air injector positioned within said compartment, a source of fire extinguishing fluid under pressure connected with said injector for actuating the latter for ejecting said fluid toward said engine in a gaseous state and for inducing the circulation of air in said compartment through said injector in mixing relationship with said fluid, said injector having an intake at one end for said air and an outlet at the opposite end for the air-fluid mixture, said intake being adjacent but spaced from said fire wall for drawing air away from said fire wall, the said outlet being directed away from said fire wall, and toward said engine.

2. In an airplane having a compartment for the engine including a fire wall rearwardly of the engine relative to the direction of flight of said airplane and between said engine and the remainder of the airplane, an air injector positioned within said compartment, a source of fire extinguishing fluid under pressure connected with said injector for actuating the latter for ejecting said fluid toward said engine in a gaseous state and for inducing the circulation of air in said compartment through said injector in mixing relationship with said fluid, said injector having an intake at one end for said air, a second air injector at the side of said fire wall opposite said first mentioned injector connected with a source of fire extinguishing fluid under pressure and directed toward said fire wall.

3. In an airplane having a compartment for the engine including a fire wall rearwardly of the engine relative to the direction of flight of said airplane and between said engine and the remainder of the airplane, an air injector positioned within said compartment, a source of fire extinguishing fluid under pressure connected with said injector for actuating the latter for ejecting said fluid toward said engine in a gaseous state and for inducing the circulation of air in said compartment through said injector in mixing relationship with said fluid, said injector having an intake at one end for said air, a second air injector at the side of said fire wall opposite said first mentioned injector connected with a source of fire extinguishing fluid under pressure and directed toward said fire wall, said first mentioned injector having its intake adjacent but spaced from said fire wall and having its outlet directed away from said fire wall.

4. In an airplane having aligned wings and engine nacelles along the forward edges of said wings, a fire extinguishing system including pipes extending longitudinally from the tips of said wings to points adjacent said nacelles and into the latter, air injectors within each of said nacelles connected with each of said pipes, a source of gaseous fire extinguishing fluid connected with each of said pipes for actuating said injectors for causing circulation of air within said nacelles and for injection of said fluid into the air so circulated, means for connecting a source of fire extinguishing fluid under pressure to each of said pipes at said wing tips for ejection of said last mentioned fluid into said nacelles through said ejectors.

5. In an airplane having aligned wings and engine nacelles along the forward edges of said wings, a fire extinguishing system including pipes extending longitudinally of said wings from the tips thereof and into said nacelles, air injections within each of said nacelles connected with each of said pipes, means for releasably connecting the ends of said pipes with a source of fire extinguishing fluid under pressure, a section of said pipes adjacent the tips of said wings including collapsible flexible material for preventing breakage of said pipes in the event said wing tips should be distorted.

6. In an airplane having aligned wings and engine nacelles along the forward edges of said wings and a fuselage extending normal to said wings and terminating rearwardly thereof in a tail section, a fire extinguishing system comprising pipes extending from the rear end of said tail section and from the tips of said wings through said fuselage and said wings into said nacelles, means at the rear end of said tail section and at the tips of said wings for coupling a source of fire extinguishing fluid under pressure thereto respectively from outside said airplane, injector nozzles on said pipes within said fuselage, wings and in said nacelles for ejecting said fluid into said fuselage, wings and nacelles, sources of gaseous fire extinguishing fluid carried within said system connected with said pipes for supplying said last mentioned fluid to said pipes for discharge into said fuselage, wings and nacelles, and means for selectively causing said discharge of fluid from said last mentioned source.

7. In an airplane including hollow wings and an engine, a fire extinguishing system comprising a pipe extending from the tip end of one of said wings to a point adjacent said engine, means at the outer end of said pipe adjacent said tip end of said wing for coupling said pipe to a source of fire extinguishing fluid under pressure, a check valve in said pipe for preventing outflow of fluid from said pipe through said outer end, and an air injector on said pipe adjacent said engine directed generally toward the latter for ejection of such fire-extinguishing fluid and air toward said engine.

8. In an airplane including hollow wings and an engine, a fire extinguishing system comprising a pipe extending from the tip end of one of said wings to a point adjacent said engine, means at the outer end of said pipe adjacent said tip end of said wing for coupling said pipe to a source of fire extinguishing fluid under pressure, a section of said pipe adjacent said tip end of said wing being of collapsible self sealing material for sealing said pipe at said section against leakage of fluid past said section upon in the event of distortion of said section through injury to said wing, and a discharge nozzle on said pipe adjacent said engine and directed toward the latter for discharge of fluid from said pipe onto said engine.

9. In an airplane having aligned wings and walls defining an enclosed fire-hazard area, a fire extinguishing system comprising a pipe extending longitudinally of said wings from their tip ends inwardly and into said area, a discharge nozzle on said pipe within said area, means for detachably coupling a source of fire extinguishing fluid with the said pipe at points adjacent said tip ends, and removable closures normally closing said pipes at said tip ends of said wings.

10. In an airplane having aligned wings and walls defining an enclosed fire-hazard area, a fire extinguishing system comprising a pipe extending longitudinally of said wings from their tip ends inwardly and into said area, a discharge nozzle on said pipe within said area, means for detachably coupling a source of fire extinguishing fluid with the said pipe at points adjacent said tip ends, and removable closures normally closing said pipes at said tip ends of said wings, said airplane including a fuselage extending normal to said wings, a second pipe extending longitudinally through said fuselage to the tail section of said fuselage and communicating with said first mentioned pipe, means at the end of said tail section for detachably coupling a source of fire extinguishing fluid with said pipe, and a removable closure normally closing the said second pipe at said tail section.

11. In an airplane having aligned wings and walls defining an enclosed fire-hazard area, a fire extinguishing system comprising a pipe extending longitudinally of said wings from their tip ends inwardly and into said area, a discharge nozzle on said pipe within said area, means for detachably coupling a source of fire extinguishing fluid with the said pipe at points adjacent said tip ends, and removable closures normally closing said pipes at said tip ends of said wings, a source of fire extinguishing fluid within said airplane under pressure connected with said pipe, and a valve for controlling the flow of fluid from said last mentioned source into said pipe.

12. In an airplane having aligned wings and walls defining an enclosed fire-hazard area, a fire extinguishing system comprising a pipe extending longitudinally of said wings from their tip ends inwardly and into said area, a discharge nozzle on said pipe within said area, means for detachably coupling a source of fire extinguishing fluid with the said pipe at points adjacent said tip ends, and removable closures normally closing said pipes at said tip ends of said wings, a source of fire extinguishing fluid within said airplane under pressure connected with said pipe, and a valve for controlling the flow of fluid from said last mentioned source into said pipe, a check valve between said last mentioned source and said pipe for preventing reverse flow of fluid from said pipe to said last mentioned source, whereby fire extinguishing fluids of different characteristics may be separately injected into said pipe, said pipe including a check valve therein at points adjacent said wing tips for preventing outflow of fluid in said pipes toward the ends thereof at said wing tips.

CHARLES B. DAVIS.

REFERENCES CITED

The following references are of record in the file of this patent:

UNITED STATES PATENTS

| Number | Name | Date |
|---|---|---|
| 329,585 | Miller, Jr. | Nov. 3, 1885 |
| 2,073,204 | Friedrich | Mar. 9, 1937 |
| 2,283,775 | Thompson | May 19, 1942 |
| 2,358,199 | Allen | Sept. 12, 1944 |

FOREIGN PATENTS

| Number | Country | Date |
|---|---|---|
| 835,502 | France | Dec. 26, 1938 |